United States Patent [19]

Vilgrain et al.

[11] Patent Number: 5,123,337

[45] Date of Patent: Jun. 23, 1992

[54] SOUS VIDE REHEATING DEVICE

[75] Inventors: Stanislas Vilgrain, Washington, D.C.; John D. Bailey, Alexandria, Va.; William S. Smith, Baltimore, Md.

[73] Assignee: Vie de France Corporation, McLean, Va.

[21] Appl. No.: 789,015

[22] Filed: Nov. 7, 1991

Related U.S. Application Data

[62] Division of Ser. No. 670,891, Mar. 18, 1991.

[51] Int. Cl.⁵ .................... A47J 27/00; A47J 27/62
[52] U.S. Cl. ........................... 99/483; 99/330; 99/403; 366/144; 366/145
[58] Field of Search .............. 99/330, 331–333, 99/325, 403, 407–409, 410, 468, 486; 312/236; D7/339; 366/144–146; 219/438, 441, 442, 492, 494, 497; 364/400; 126/21 R, 299 R

[56] References Cited

U.S. PATENT DOCUMENTS

| | | |
|---|---|---|
| D. 191,024 | 8/1961 | Buday . |
| D. 212,984 | 12/1968 | Mecredy . |
| D. 225,515 | 10/1971 | Goetz . |
| D. 233,253 | 10/1974 | Emanuele . |
| D. 287,795 | 1/1987 | Streepy . |
| 1,979,222 | 10/1934 | Goodwin . |
| 2,372,978 | 4/1945 | Pelenberg . |
| 2,805,314 | 9/1957 | Michaelis . |
| 3,525,299 | 8/1970 | Gouwens . |
| 3,626,840 | 12/1971 | Day . |
| 3,732,468 | 5/1973 | Witt et al. . |
| 3,797,377 | 3/1974 | Lotter et al. . |
| 3,859,981 | 1/1975 | Yoshida . |
| 3,866,472 | 2/1975 | Witt . |
| 3,869,972 | 3/1975 | Chase . |
| 3,887,786 | 6/1975 | Witt et al. . |
| 3,894,483 | 7/1975 | Anetsberget et al. . |
| 3,904,852 | 9/1975 | Rivelli et al. . |
| 3,919,523 | 11/1975 | Wadia et al. . |
| 3,950,632 | 4/1976 | Rivelli . |
| 3,958,503 | 5/1976 | Moore . |
| 3,979,056 | 9/1976 | Barnes . |
| 4,036,995 | 7/1977 | Koether et al. . |
| 4,077,690 | 3/1978 | Koether . |
| 4,113,623 | 9/1978 | Koether et al. . |
| 4,278,872 | 7/1981 | Koether et al. . |
| 4,320,285 | 3/1982 | Koether . |
| 4,441,016 | 4/1984 | Oota et al. . |
| 4,489,235 | 12/1984 | Porteous . |
| 4,580,024 | 4/1986 | Thomas . |
| 4,610,238 | 9/1986 | Veth . |
| 4,644,931 | 2/1987 | Veth . |
| 4,686,958 | 8/1987 | Skelton et al. . |
| 4,688,475 | 8/1987 | Witt et al. . |
| 4,724,825 | 2/1988 | Fritsch et al. . |
| 4,740,888 | 4/1988 | Ceste, Sr. et al. . |
| 4,741,623 | 5/1988 | Haeuser et al. . |
| 4,742,455 | 5/1988 | Schreyer . |
| 4,782,445 | 11/1988 | Pasquini . |
| 4,812,625 | 3/1989 | Ceste, Sr. . |
| 4,873,919 | 10/1989 | Janssen . |

FOREIGN PATENT DOCUMENTS

| | | |
|---|---|---|
| 1141056 | 4/1957 | France . |
| 760393 | 10/1956 | United Kingdom . |
| 2112966 | 7/1983 | United Kingdom . |

OTHER PUBLICATIONS

Keating Custom Pasta Cooking System brochure.
Pitco Frialator brochure.
Operating and Installation Instructions for the FASTRON Model 1614WXJT-STD Baking Computer (U.S. Pat. No. 4,742,455 as supplement).

*Primary Examiner*—Timothy F. Simone
*Attorney, Agent, or Firm*—Burns, Doane, Swecker & Mathis

[57] ABSTRACT

A sous vide reheating device preferably includes at least two water heating chambers with each chamber having a heating device and a thermostat for controlling the temperature of the water in the chamber. An agitation mechanism is provided to circulate the water in each chamber. Each chamber is preferably divided into a plurality of sub-chambers with each sub-chamber having an associated timer to measure the amount of time elapsed for that sub-chamber. The device may include a plate storage and warming mechanism and has a work space for preparing the sous vide foods for service to a consumer.

5 Claims, 7 Drawing Sheets

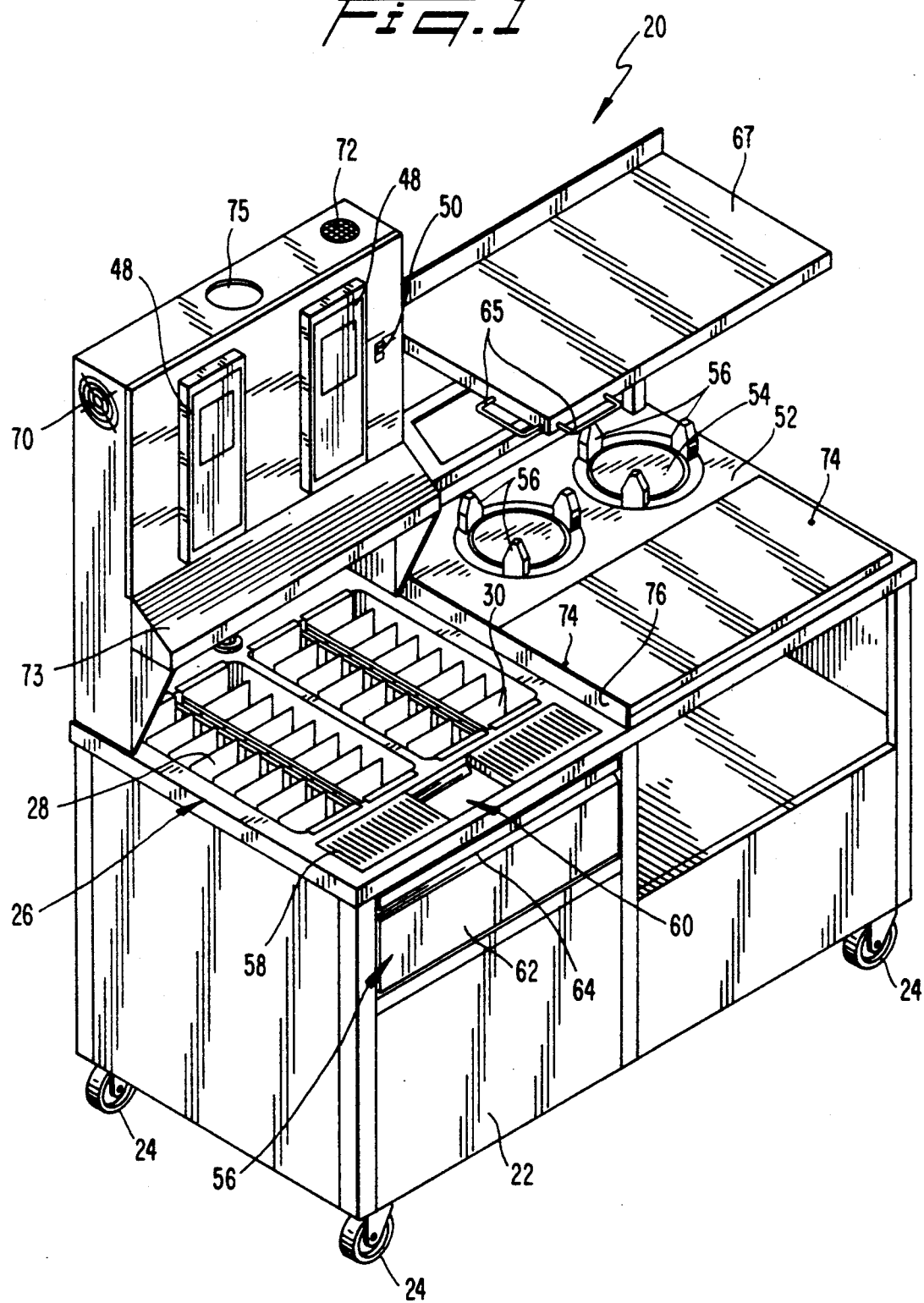

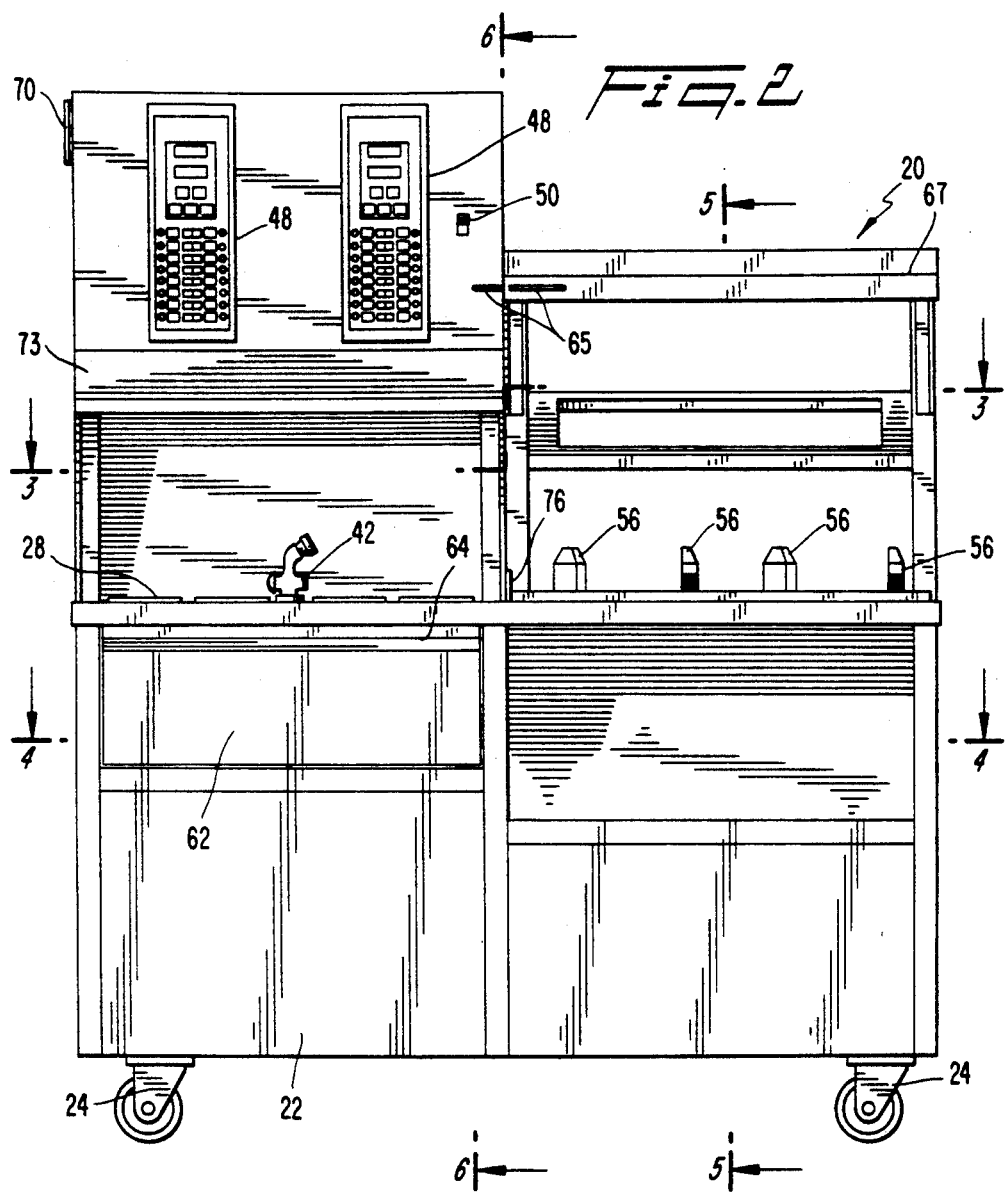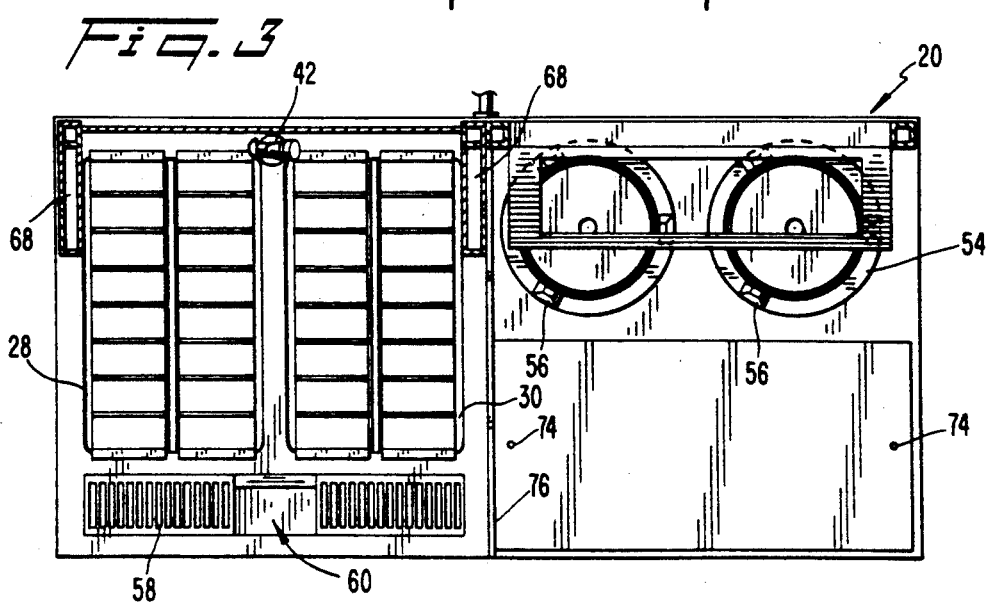

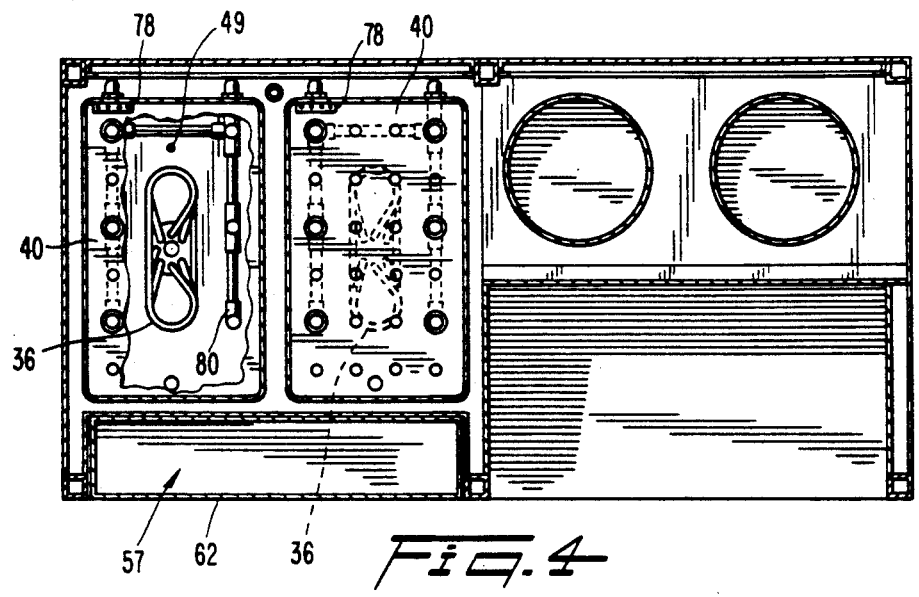
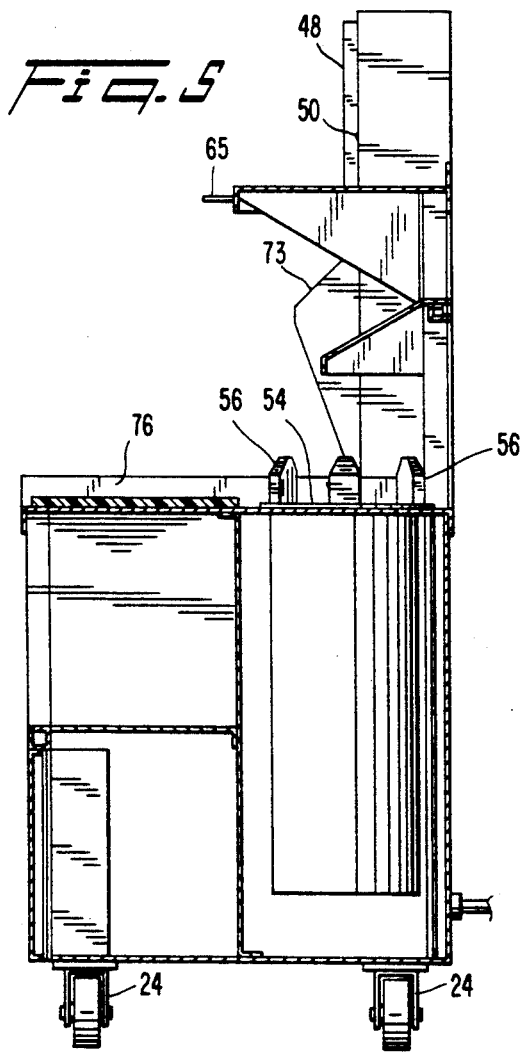
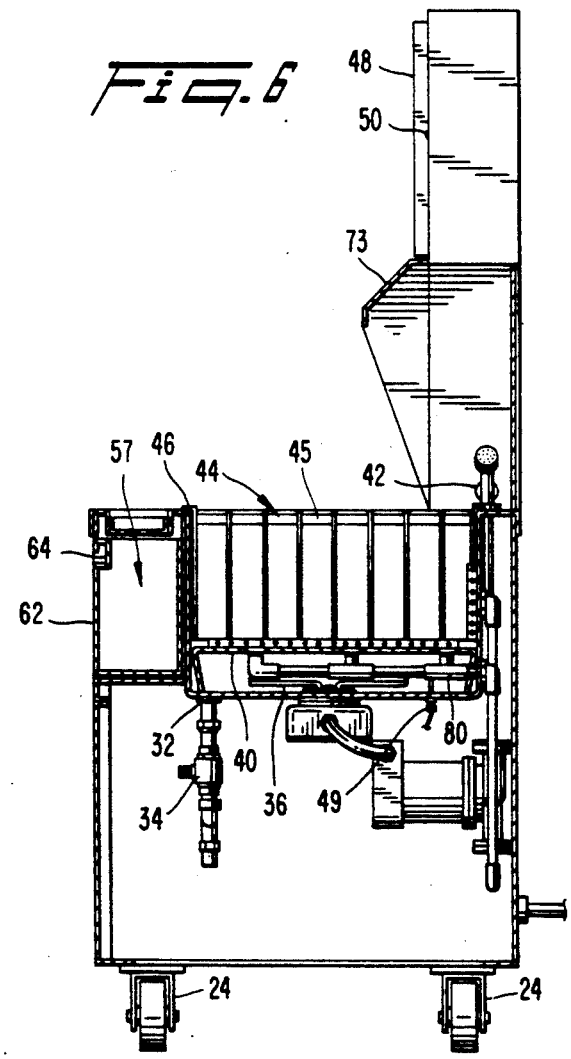

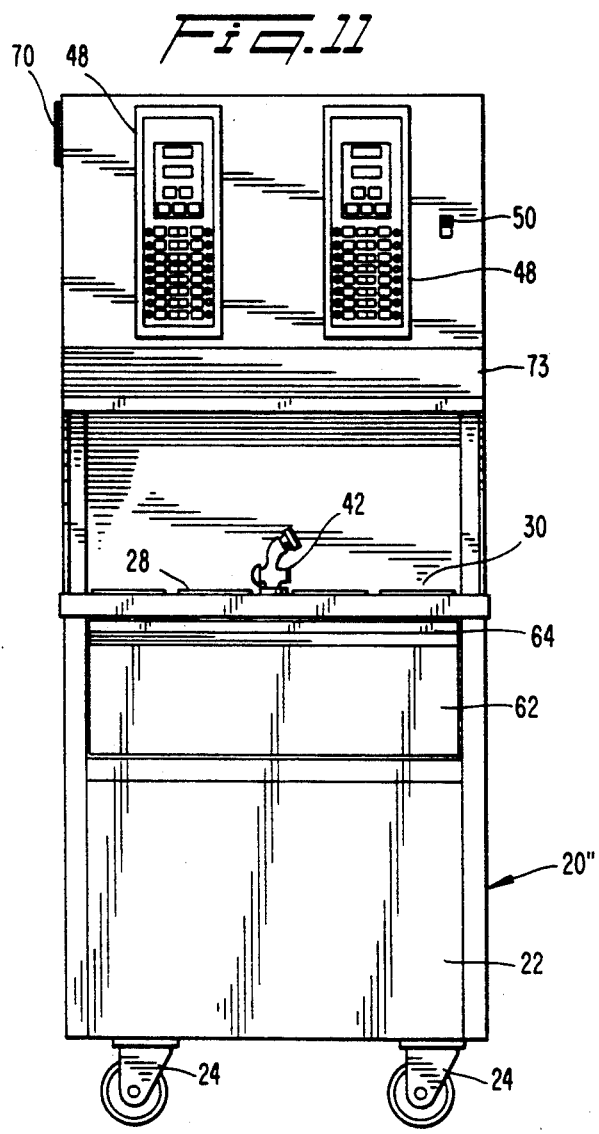
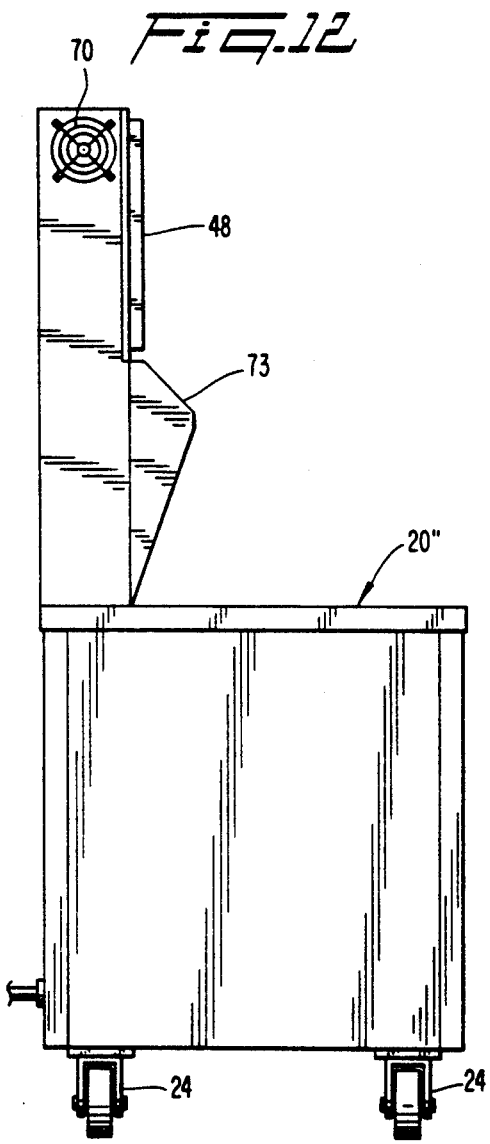
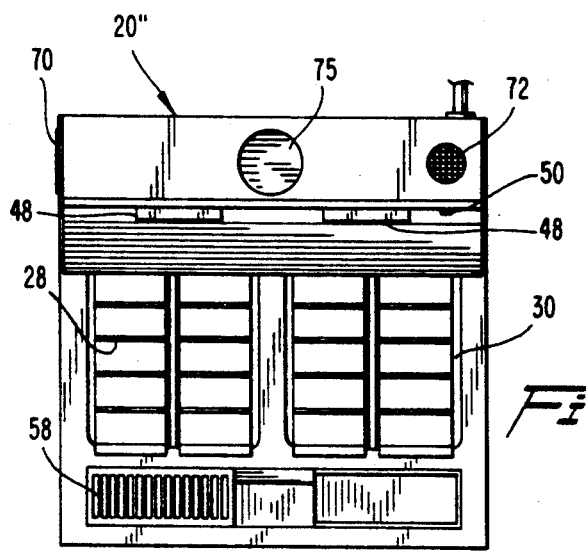

SOUS VIDE REHEATING DEVICE

This application is a divisional application Ser. No. 670,891, filed Mar. 18, 1991.

BACKGROUND AND SUMMARY OF THE PRESENT INVENTION

The preparation of foods according to a process known as "Sous Vide" (which means "under vacuum") provides an arrangement in which fully cooked foods can be packaged and stored after preparation and then reheated as desired immediately prior to serving. However, especially in the restaurant and food service industry, the need exists for reheating equipment which can permit the sous vide foods to be efficiently and promptly reheated and which facilitates the preparation of the sous vide food for service to a consumer.

According to the sous vide process, various foods are sealed in thermo-retractable pouches and then slowly cooked under vacuum at a lower than usual temperature. The cooking of the foods is performed gently at the relatively low temperature for hours under vacuum to lock in flavor, nutrients, and texture. The pouches are then rapidly chilled or instantly frozen, as desired, and then shipped to the customer.

In the sous vide process, relatively little seasoning (especially salt) is used in the cooking process. The slow cooking under vacuum causes natural fibers to soften and dissolve, leaving proteins such as beef tender enough to cut with a fork. As a result of the cooking process, measurable shrinkage is reduced usually to about 2% or less.

In this way, relatively high quality meals may be prepared at a remote location, sealed under vacuum, and then reheated as needed. Entrees, sauces, and side dishes are each individually sealed so that they can be selectively reheated and combined as needed. The sous vide process provides portion control, labor cost reduction, convenience, reduction of waste, and other economic benefits.

The sealed food packages are frozen or refrigerated after preparation until the sealed food packages are to be reheated. In order to indicate that the products have been properly maintained at storage temperatures, a warning indicator may be provided on the package. If the product has been improperly exposed to elevated temperatures, the indicator will change color or otherwise indicate that the product is no longer usable and should be disposed.

As an example of a typical sous vide meal, a grilled chicken breast may be individually packaged under vacuum. Then the grilled chicken breast is reheated and prepared in any of a large variety of ways. For example, the chicken breast may be garnished with tomato, lettuce, and onion and served on French bread. The chicken breast could instead be served with Dijon mustard sauce on a bed of rice garnished with fresh vegetables. In another example, the grilled chicken breast could be sliced and served with sweet and sour sauce and accompanied by baby vegetables. Literally dozens of possibilities exist for serving the grilled chicken breast with each of the possibilities differing from one another in terms of the sauce, garnish, vegetables, etc.

For particular service situations, it may be desirable to have a plurality of food portions provided in a single pouch. For example, six, twelve, or twenty four grilled chicken breasts may be provided within a single pouch for simultaneous preparation.

Previously, reheating of the pouches was achieved merely by immersing the pouches in heated water in a pan on a stove top. However, the need exists for equipment specifically designed to accommodate sous vide reheating and food preparation in an efficient and economical manner.

Accordingly, it is an object of the present invention to provide a reheating device for sous vide food preparation which overcomes the disadvantages of the prior art.

Yet another object of the present invention is to provide a reheating apparatus for sous vide food which is relatively simple and easy to install and use.

Still another object of the present invention is to provide a reheating device for sous vide food which facilitates the prompt and efficient preparation of sous vide food for serving to a consumer.

Yet still another object of the present invention is to provide a reheating device for sous vide food which provides all of the equipment and accessories needed for reheating and serving sous vide food in a single, convenient arrangement.

These and other objects are accomplished by a sous vide reheating device according to the present invention which includes a reheating bath unit which includes at least first and second water heating chambers which are independently temperature controlled. The first chamber is arranged to preheat the sous vide pouches and has a water bath which is maintained at a first predetermined temperature (preferably about 135° F. to about 140° F.). The second chamber is arranged to quickly heat the sous vide pouches immediately prior to serving and has a water bath which is maintained at a second predetermined temperature (preferably between 165° F. to about 212° F.). A plurality of timers are provided for the first and second chambers so as to determine the length of time that particular pouches have been provided in the first and second chambers.

The sous vide reheating device also preferably includes an integral plate storage and warming unit along with a food preparation area and waste disposal area. The device preferably includes various containers for garnishes, condiments, and other foods used in connection with the preparation of the sous vide food portions for service to a consumer. If desired, the device may include a freezer or a refrigerator beneath the work space.

The present invention also includes a reheating bath unit which includes a water heating chamber which is subdivided into a plurality of sub-chambers. The chamber has a water bath which is maintained at a predetermined temperature (preferably about 135° F. to about 140° F. or between about 165° F. to about 212° F.). A plurality of timers are provided with one timer being associated with each of the sub-chambers so as to determine the length of time that particular pouches have been provided in the sub-chambers. An agitation device is provided to circulate the water in the chamber.

BRIEF DESCRIPTION OF THE DRAWINGS

Preferred embodiments of the present invention will be described in greater detail with reference to the accompanying drawings, wherein like members bear like reference numerals and wherein:

FIG. 1 is a pictorial view of a first embodiment of a sous vide reheating device according to the present invention;

FIG. 2 is a front view of the sous vide reheating device of FIG. 1;

FIG. 3 is a view through the line 3—3 of FIG. 2;

FIG. 4 is a view through the line 4—4 of FIG. 2;

FIG. 5 is a view through the line 5—5 of FIG. 2;

FIG. 6 is a view through the line 6—6 of FIG. 2;

FIG. 11 is a front view of a third embodiment of a sous vide reheating device according to the present invention;

FIG. 12 is a right side view of the device of FIG. 11;

FIG. 13 is a top view of the device of FIG. 11;

DETAILED DESCRIPTION OF THE PREFERRED EMBODIMENTS

Figure 7:
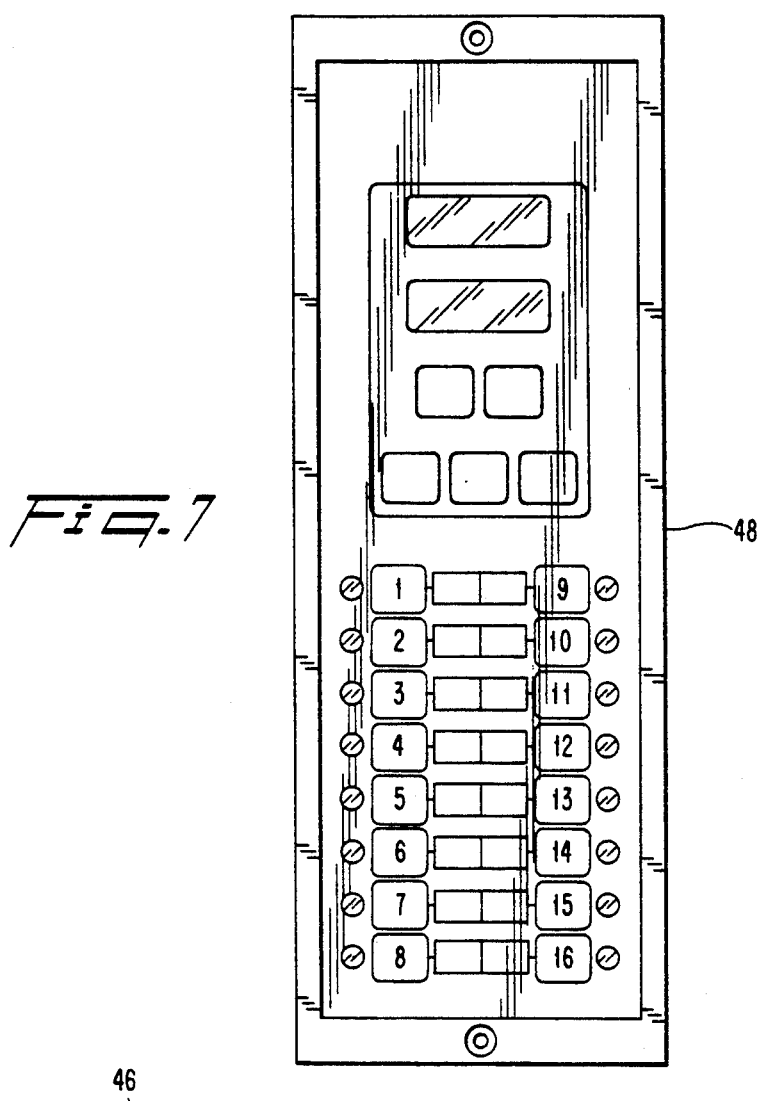
FIG. 7 is a front view of a timer unit of the sous vide reheating device of FIG. 2.

With reference to FIG. 1, a sous vide reheating device 20 according to the present invention includes a rectangular housing 22 which is provided on casters 24 for ease in moving. As desired, the device may be mounted on legs rather than casters. Suitable casters are provided by Jarvis & Jarvis and have 5 inch tires which swivel and lock.

The device 20 includes a reheating bath unit 26 having a first water heating chamber 28 and a second water heating chamber 30 (see also FIGS. 2 and 3). The first and second water heating chambers 28, 30 are generally rectangular in configuration. The chambers 28, 30 each have a volume which is sufficient to accept a number of sous vide pouches and also have sufficient water to efficiently heat the pouches.

Figure 14:
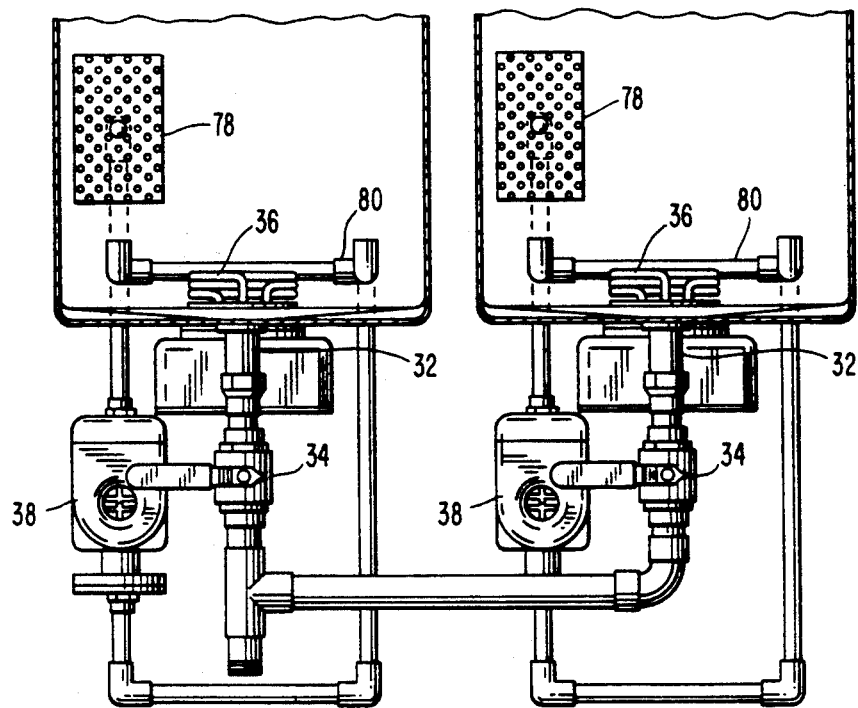
FIG. 14 is an illustration of the piping arrangement of the sous vide reheating device of FIG. 2.

The chambers 28, 30 are each provided with a drain 32 (see FIG. 14) with each drain being controlled by a gate valve 34. If the chambers 28, 30 are connected to one another through a common drain with a single gate valve, hotter water from one chamber may tend to migrate to the other chamber which is generally undesirable. Instead, it is preferable to separate the water in one bath from the other so that the predetermined temperature of each chamber may be more easily maintained.

The outlets of the gate valves may be connected to one another and then directed to a permanent drain or the gate valves may be configured so as to direct the water in the respective chambers to a hose or to a removable receptacle for disposal as desired.

Each of the first and second water heating chambers includes an electrical heating element 36 provided in the chamber near the bottom of the chamber. Suitable heating elements include Chromalox brand heating elements. The heating elements 36 may be controlled by electrical thermostat units (such as Chromalox brand temperature controllers) discussed below in order to maintain a relatively highly accurate water temperature in each chamber.

A water circulation system is also provided for each chamber with each circulation system including a water pump 38 provided beneath the respective water heating chamber. The pump has an inlet in communication with the chamber and an outlet likewise into the chamber which may include a flow manifold to facilitate vigorous circulation of the water within each chamber. The water pumps may be operated continuously during operation of the sous vide reheating device or more preferably may be activated whenever a sous vide pouch has been placed in a water bath and a timer for the pouch has been started. The water pumps facilitate a uniform temperature of the water within each chamber.

In order to prevent the sous vide pouches from contacting the heating elements 36 or the thermostat sensor directly, and to prevent an obstruction of the drain and pump outlet, a perforate false bottom 40 (see FIG. 4) is provided in each water chamber. The perforate false bottoms preferably have sufficient openings so as to enable a vigorous exchange of water across the false bottom without enabling the pouches (or the operator) to inadvertently contact the heating element, the sensor, or the pump outlet.

The reheating device 20 includes a water supply faucet 42 which has a spray head and a flow control valve. The faucet 42 is provided on a flexible extension hose so as to enable the faucet to reach both water heating chambers as well as to reach other areas of the device for cleaning, etc. The faucet is connected to a supply of potable water, for example through a connection hose (not shown).

Figure 8:
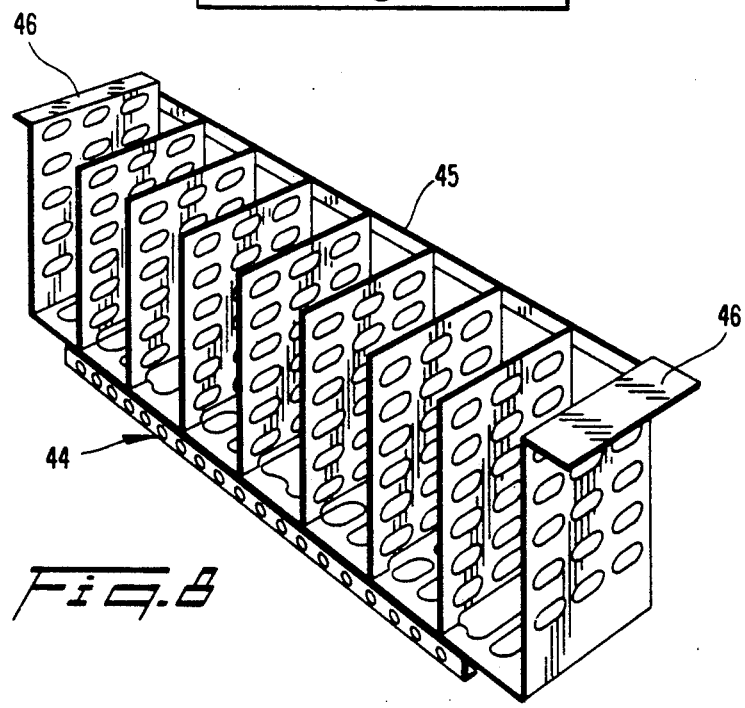
FIG. 8 is a pictorial view of a basket provided within a water bath of the sous vide reheating device of FIG. 2.

The first and second water heating chambers may include a plurality of sub-dividers which partition each of the water chambers into a plurality of sub-chambers. In this way, the pouches within each water chamber may be distinguished according to the particular sub-chamber in which the pouch has been placed. A basket 44 (see FIG. 8) to form the sub-chambers comprises perforate walls arranged perpendicularly to a perforate base. The walls are sufficient to maintain the pouches within a particular sub-chamber without unduly restricting the flow of water from one sub-chamber to another.

In a typical chamber, two baskets 44 are provided to form sixteen sub-chambers in each water heating chamber. Each basket has a horizontal bar 45 along one side so as to keep the pouches from one sub-chamber from inadvertently moving into another sub-chamber. When in place, the horizontal bars are provided alongside one another in the middle of the chamber. The horizontal bars also provide stability for the walls of the baskets 44.

The first and last walls of each basket have flanges 46 provided along the top edge of the walls. The flanges 46 extend outwardly an amount sufficient to engage the top surface of the reheating bath unit.

A timer control unit 48 (see also FIG. 7) is provided above each of the first and second water reheating bath units. Each timer control unit 48 is preferably mounted at a convenient height for viewing by an operator of the unit. Each of the timer control units receives a signal from a thermostat 49 to indicate the temperature of the water in the reheating bath unit. The timer control unit then varies the time for each pouch depending upon the difference between the actual temperature of the water and the predetermined temperature.

The timer control unit 48 may also control the operation of the associated heating element 36 in response to the temperature of the water in each chamber.

The thermostats for the water heating chambers preferably control the temperature to within 5° F. (plus or minus) of the predetermined temperature. It is most preferred that the thermostats be configured to control the temperature to within 1° F. (plus or minus) of the predetermined temperature since this level of control facilitates the efficient and accurate prewarming and heating of the sous vide pouches.

Although an electric heating element is described in connection with the preferred embodiments, a suitable, conventional gas heating mechanism may be used instead. Similarly, the water within the first and second chambers may be agitated in any of a number of known manners such as by a circulation pump, a mechanical agitator or by the use of filtered compressed air which is released into the chambers. In the preferred embodiment, the water is circulated by diaphragm compressors to prevent contamination of the water with oils and greases in the pumps. Suitable, conventional diaphragm pumps such as Grainger Stock 5Z348 provided by Thomas Industries may be used.

In the preferred embodiment, the timers of the timer control unit are digital timers and permit the operator to set a predetermined amount of time on each timer. In addition, the timers may have preset time values for particular sous vide foods which then enables the operator to merely set the timer for the specific type of sous vide pouch to be heated or prewarmed. For example, if a grilled chicken breast sous vide pouch should be immersed in the second water heating chamber for 50 seconds prior to serving, the timer would have a selection labeled "chicken" or "grilled chicken" which would start the timer for 50 seconds when selected. Each of the timers 50 may have an alarm or other indication that the selected amount of time has elapsed.

A preferred timer control unit is the FASTRON Model 1614 WXJTSTD Baking Computer which is available from Food Automation-Service Techniques, Inc. of Stratford, Connecticut. U.S. Pat. Nos. 3,732,468; 3,866,472; 3,887,786; 3,894,483; 3,904,852; 3,950,632; 3,979,056; 4,036,995; 4,077,690; 4,113,623; 4,278,872; 4,320,285; 4,610,238; 4,644,931; 4,688,475; 4,740,888; 4,742,455; 4,782,445; and, 4,812,625 describe certain features of the FASTRON unit and these patents are incorporated herein by reference.

The timer control unit has 16 different timers, each one corresponding to one of the sub-chambers formed by the baskets 44 in each water reheating bath. The timer control unit displays the temperature of the bath and may also display the time remaining for any particular timer. Typically, the timer will display the time remaining for the sub-chamber having the shortest remaining time till completion. Each of the timers may also have lights which indicate which timers are in operation and which timers are the next ones to have their time elapse.

In the preferred embodiment, the timer control unit has been modified by the supplier to vary the reheating times in response to the actual temperature of the water in the reheating bath. For example, for each different sous vide product, a preferred reheating time in each bath may be determined depending upon the temperature at which each bath is to be maintained. These reheating times may be stored in the memory of the timer control unit. However, depending upon how many frozen sous vide pouches are placed in each bath, the water temperature in the bath may suddenly drop and will require some time to be returned to the predetermined temperature. The timer control unit will then adjust the reheating time in response to the actual water temperature in the reheating bath and will continue to adjust the reheating time as the temperature of the water in the reheating bath changes. In this way, a very precise control may be obtained over the reheating of each pouch in each sub-chamber of the reheating baths.

In order to prevent a fire hazard or harm to the operator, the thermostats for the heating elements preferably have a low water cutoff in the event that the amount of water in the associated water heating chamber is below a predetermined amount.

If the water pumps are not controlled by the timer control unit, the control panel may also include a pump control switch which enables the water pumps 38 to be manually turned on and off. With reference to FIG. 1, a main on-off switch 50 is provided to turn the sous vide reheating device on and off as desired.

An electrical circuit panel may be provided, if needed, beneath the work space (and in front of the plate storage/warmer unit). The circuit panel may include a plurality of circuit breakers (not shown) and is connected to a source of electricity through a suitable plug and cord (not shown) or is hard wired. Preferably, the wiring in the device is put in "sealtight" water resistant conduit so as to prevent damage from moisture.

The timer control units 48 are preferably mounted immediately above the associated water heating chambers. Accordingly, the units 48 are subjected to considerable water vapor from the water heating chambers. To minimize the effects of such exposure, a removable front panel of the housing for the timer control units includes a gasket (not shown) to seal the front panel with respect to the housing. In addition, the interior of the housing has duct work 68 (see FIG. 3) which extends beneath the water heating chambers on either side of the chambers 28, 30. The housing is also provided with a ventilation fan 70 at the top of the housing. An opening 72 may be provided to supply air in the event that the ducts 68 should become obstructed. In this way, a constant flow of air having a relatively low humidity is passed through the control panel housing.

In addition, the housing is provided with a hood 73 above the water heating chambers and a ventilation fan (not shown, such as a 600 c.f.m. fan) which removes the water vapor up through the housing in a sealed passageway and exhausts the water vapor through an outlet 75. If desired, the outlet 75 may be ducted to the outside. Preferably, the timer control unit 48 is configured so as to activate both the water circulation pumps and the air ventilation pump for the hood whenever one of the timers has been activated.

With reference again to FIG. 1, the first and second water heating chambers 28, 30 are preferably separated from one another by a metal divider and may be insulated with respect to one another. The chambers are provided at the left side of the unit 20 with the right side of the unit including a work space 52 which may include a cutting board (such as a ½ inch thick white "Zip-lite" cutting board). The cutting board is received on a pair of pins 74 which project upwardly from the surface of the device. The device also includes a plate storage/warmer unit 54 such as an "Up-a-Matic" brand plate dispenser or a "Lowerator" heated plate dispenser.

The work space 52 may be covered by a wooden or plastic cutting surface as desired to facilitate food preparation and clean-up. In order to prevent water from spilling onto the right side of the device, a splash shield 76 may be provided between the water heating chambers and the work space and plate storage/warmer unit. The splash shield extends upwardly about one inch from the surface of the device.

The plate storage/warmer unit 54 includes two vertical storage bins for plates with each bin counterbalanced so as to maintain a plate approximately at or slightly above the vertical height of the work space 52. Each bin includes a plurality of fingers 56 which extend slightly above the normal uppermost position for the plates so a to prevent the uppermost plates from inadvertently falling off of the stack of plates in each bin.

The plate storage/warmer unit is provided with a heater which warms the plates to a predetermined temperature and maintains the plates at that temperature until removed from the bin. Because of the nature of the sous vide food, it is preferred that the plate storage/warmer unit heat the plates to a temperature of about 150° F. Since the sous vide food has only been reheated to a temperature of no more than 212° F., the plates on which the food are served are preferably prewarmed so as not to unduly cool the food prior to consumption. Since the sous vide food is prepared at a temperature which is generally ready to be eaten (it does not have to be allowed to cool first, as with conventionally cooked food) the prewarmed plates are preferably warmed to a higher temperature than is common in the food preparation industry.

Commercial plate storage/warmer units are available which may be preset to warm the plates at a temperature between 140° F. to 175° F. Other commercially available plate storage/warmer units may need to be modified by replacing the heating element and/or the thermostat control so as to preheat the plates to the desired temperature. If desired, the thermostat controller for the plate warmer could be infinitely variable or could have, for example, three settings such as low, medium, and high with the medium temperature being optimum for sous vide foods.

In front of the first and second water heating chambers, a waste chamber 57 is provided. A pair of drip trays 58 are provided on either side of an opening 60 having a tapered edge to direct material into the waste chamber 56. Each of the drip trays has a removable grate on which the sous vide pouches are placed immediately upon removal from the first and second chambers. Therefore, any water still dripping from the pouches may be drained into the waste chamber 56. The empty pouches may then be discarded into the waste chamber through the opening 60. Two drip trays are provided so that, for example, one side could be used for fish and the other side used for meat.

The waste chamber 56 includes a removable receptacle 62 having a recessed handle 64 and which may be periodically emptied into a larger trash receptacle as needed.

Above the plate storage/warmer unit is a box frame which may receive a number of accessories such as a condiment storage tray 66 which includes a receptacle for a plurality of individual bins or containers. Depending upon the specific sous vide foods being prepared, various garnishes, condiments, vegetables, etc. will be needed in order to prepared a particular dish. The condiment storage tray 66 is oriented at a convenient height and angle so as to facilitate access to the condiments, garnishes, etc. by the operator. The condiment storage tray is preferably configured so as to hold "1/6th pans" or "¼ size pans" which are 6 inches deep.

The condiment storage tray may be a suitable, conventional refrigerated condiment storage tray. Other accessories include heat lamps, ticket racks, and finishing ovens (not shown) which snap onto the box frame and which are interchangeable.

With reference again to FIG. 1, the sous vide reheating device 20 may also receive other accessories on the box frame such as a microwave shelf 67. The microwave shelf 64 preferably includes racks 65 to receive various utensils such as tongs used in the preparation of the sous vide packages.

The first water heating chamber 28 is arranged to preheat the sous vide pouches and has a water bath which is maintained at a first predetermined temperature (preferably about 135° F. to about 140° F.). Although a temperature of 135° F. is considered to be more desirable, national legislation as well as some state and local regulations may require that cooked food that is prewarmed be stored at a temperature not less than 140° F.

The second water heating chamber 30 is arranged to quickly heat the sous vide pouches immediately prior to serving and has a water bath which is maintained at a second predetermined temperature (preferably between 160° F. to about 165° F. or from about 200° F. to about 212° F.).

With reference again to FIG. 14, each of the water circulation pumps withdraws water from the upper portion of the associated chamber through a perforate member 78. The pump then supplies the water to lower portion of the chamber through a manifold 80. Preferably, the manifold is U-shaped so as to supply water uniformly throughout the bottom of the chamber.

Alternatively, the water in the chamber may be agitated by blowing air into the lower portion of the chamber through a manifold.

Figure 9:
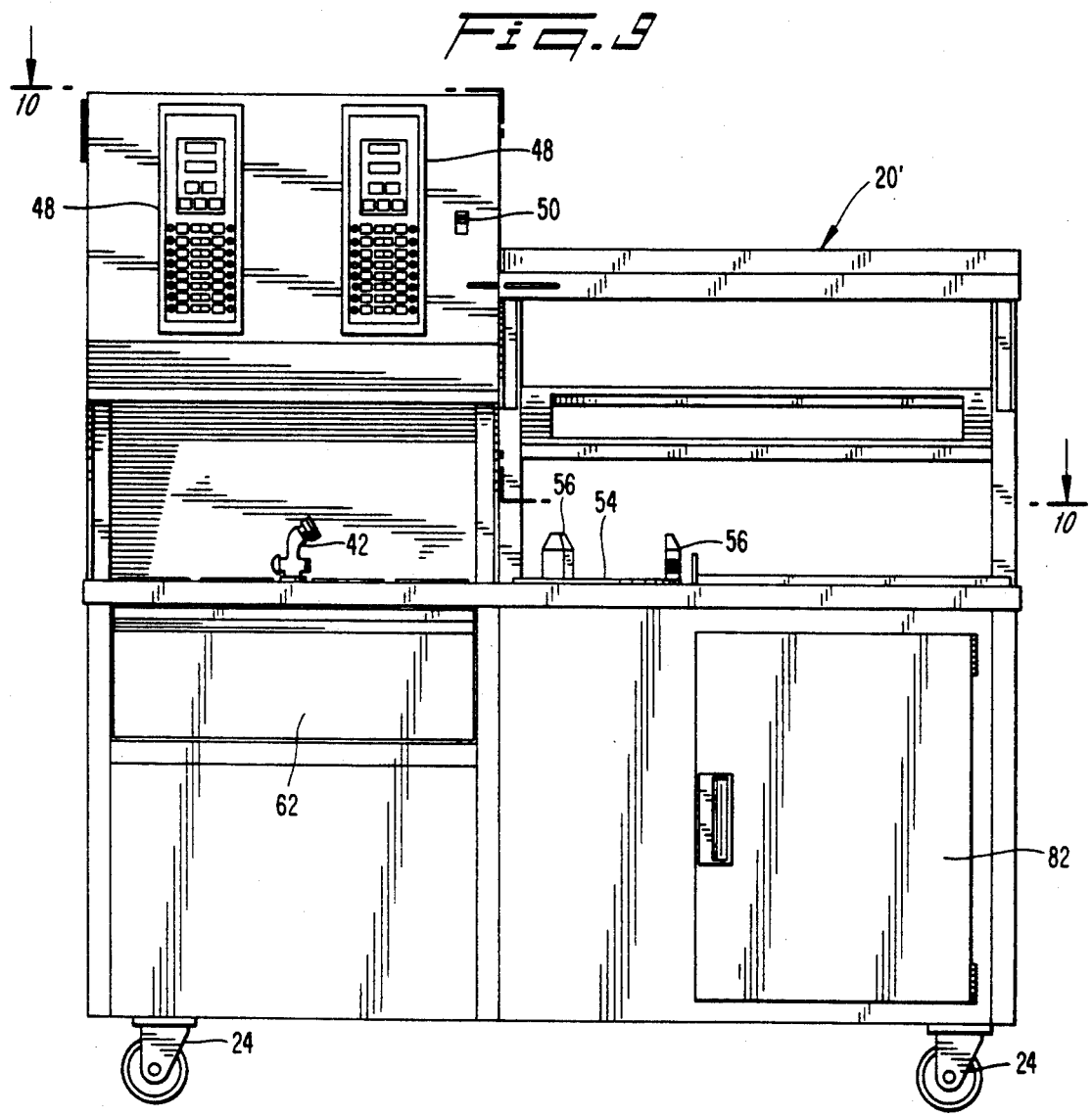
FIG. 9 is a front view of a second embodiment of a sous vide reheating device according to the present invention.
Figure 10:
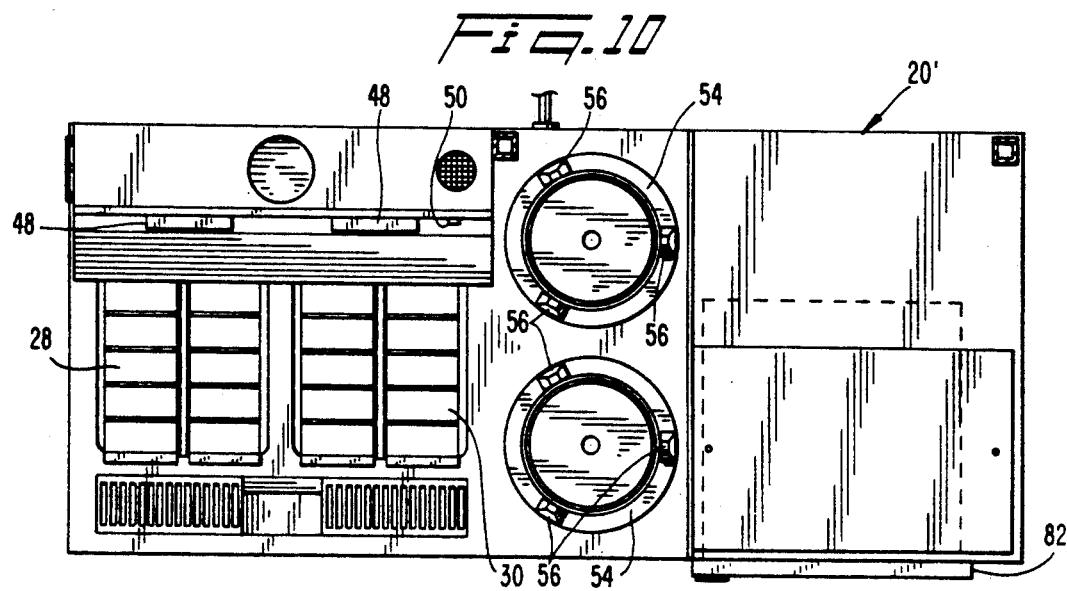
FIG. 10 is a view through the line 10—10 of FIG. 9.

With reference now to FIG. 9, a modified embodiment 20' of the sous vide reheating device includes a freezer or refrigerator 82. In order to accommodate the freezer or refrigerator 82, the plate storage/warmer unit is provided between the water heating chambers 28, 30 and the freezer or refrigerator 82.

With reference to FIG. 11, another embodiment 20" of the sous vide reheating device is configured without the plate storage/warmer unit and without any work space alongside the water heating chambers.

Figure 15:
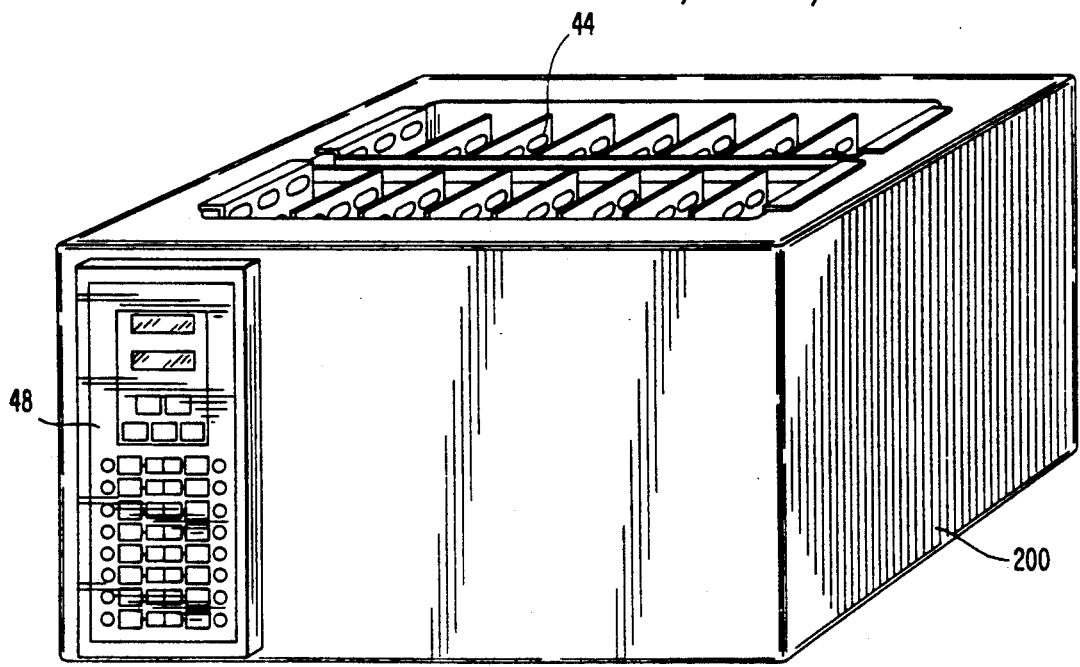
FIG. 15 is a pictorial view of a fourth embodiment of a sous vide reheating device according to the present invention.

With reference to FIG. 15, a water heating device for reheating sous vide pouches may be configured in a stand alone housing 200 to be provided on a counter top or table, as desired. The housing 200 includes sixteen water heating chambers with each of the chambers being provided with an associated timer in the same manner as described above in connection with the embodiment of FIG. 1. The stand alone unit of FIG. 15 is essentially one of the water heating chambers 28, 30 together with the associated timer control unit 48, the baskets 28, and the heater and water circulation system of the embodiment of FIG. 1. However, since only one chamber is provided in the device of FIG. 15, the water can be maintained at only one temperature. In this way, the unit as shown cannot be used both to heat and maintain sous vide pouches and to heat the pouches immediately prior to serving. If both functions are desired, the unit could be provided with two water heating chambers in the manner described above in connection with the embodiment of FIG. 1.

Preferably all of the embodiments are made from stainless steel or cold rolled steel for convenience in cleaning and durability. The embodiments of FIGS. 1, 9, and 11 all have flush, removable panels which facilitate access to the interior of the devices.

As desired, the devices may be configured in different sizes and may have four rather than two water heating chambers. If four water heating chambers are provided, each of the chambers would have its own thermostat, timer control unit, heating element and water circulation mechanism. The four chambers could be arranged as desired, such as the first and third chambers being maintained at 135° F. to about 140° F. to prewarm pouches and the other two chambers maintained at 160° F. to 212° F. to heat the pouches immediately prior to serving. If desired, the plate storage and warming unit could have four bins as well or could be provided as a stand along unit.

In operation, the first and second chambers are filled with water and then the thermostats are set to the preferred temperatures. The first chamber is preferably set to a temperature of about 135° F. to about 140° F. and is used to prewarm sous vide pouches that are either frozen or refrigerated. The second chamber is preferably set to a temperature of about 165° F. to about 212° F. and is used to heat the sous vide pouches immediately prior to serving. The pouches may be inserted into the first chamber for up to about five hours and then used as needed. As desired, a pouch which has been prewarmed is moved from the first chamber into the second chamber and kept there for the appropriate period of time (usually about one minute). If the pouch has not been prewarmed, it may be directly inserted into the second chamber and kept there for an appropriately longer period of time to fully heat the sous vide food.

As the pouches are inserted into the chambers (or into the sub-chambers of each chamber), a timer may be actuated to count down a predetermined amount of time. For example, as the pouches are first inserted into the first chamber, a timer may be set for five hours. When the time has elapsed, an alarm may sound. If the pouches have not yet been used, they may be discarded or otherwise used as appropriate.

When a sous vide pouch has been fully heated, the pouch is removed from the chamber and drained on the drip tray. A prewarmed plate is removed from the plate storage and warming unit and the pouch is opened. The contents of the pouch are then arranged on the plate and the pouch is discarded into the waste receptacle. The food on the plate may be arranged as desired with garnishes, sauces and condiments and then served to the consumer.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. A water bath reheating device comprising
a generally rectangular housing;
chamber means for receiving a volume of water, said chamber means being provided in said housing;
heating means for heating the water in the chamber means;
thermostat means for controlling the heating means to selectively maintain the water in the chamber means at a predetermined temperature;
agitation means to circulate the water about the chamber means;
means for defining a plurality of sub-chambers within the chamber means; and
timer means for selectively indicating the amount of time that has elapsed from a predetermined moment, said timer means including a plurality of individually controllable timers, with a different timer being associated with each of the sub-chambers.

2. A water bath reheating device comprising
a housing;
chamber means for receiving a volume of water, said chamber means being provided in said housing;
heating means for heating the water in the chamber means;
thermostat means for controlling the heating means to selectively maintain the water in the chamber means at a predetermined temperature;
agitation means to circulate the water about the chamber means;
means for defining a plurality of sub-chambers within the chamber means; and
timer means for selectively indicating the amount of time that has elapsed from a predetermined moment, said timer means including a plurality of individually controllable timers, with a different timer being associated with each of the sub-chambers.

3. A sous vide reheating device comprising
a housing;
first chamber means for receiving a volume of water, said first chamber means being provided in said housing;
first heating means for heating the water in the first chamber means;
first thermostat means for controlling the first heating means to selectively maintain the water in the first chamber means at a first predetermined temperature;
first agitation means to circulate the water about the first chamber means;
second chamber means for receiving a volume of water, said second chamber means being provided in said housing adjacent to the first chamber means;
second heating means for heating the water in the second chamber means;
second thermostat means for controlling the second heating means to selectively maintain the water in the second chamber means at a second predetermined temperature;
second agitation means to circulate the water about the second chamber means; and
timer means for selectively indicating the amount of time that has elapsed from a predetermined moment, said timer means including a plurality of individually controllable timers.

4. The sous vide reheating device of claim 3 wherein the first chamber means is selectively maintained at a temperature of about 135° F. to about 140° F. to preheat sous vide pouches, and wherein the second chamber means is selectively maintained at a temperature of about 165° F. to about 212° F. to heat the sous vide pouches immediately prior to serving to a customer.

5. The sous vide reheating device of claim 3 further comprising means for selectively subdiving said first and second chamber means into a plurality of sub-chambers.

* * * * *